United States Patent
Ougiichi et al.

(10) Patent No.: US 8,670,095 B2
(45) Date of Patent: Mar. 11, 2014

(54) LIQUID CRYSTAL DISPLAY DEVICE

(75) Inventors: Kimitoshi Ougiichi, Mobara (JP);
Hirotaka Imayama, Mobara (JP)

(73) Assignees: Japan Display Inc., Tokyo (JP);
Panasonic Liquid Crystal Display Co., Ltd., Hyogo (JP)

( * ) Notice: Subject to any disclaimer, the term of this patent is extended or adjusted under 35 U.S.C. 154(b) by 60 days.

(21) Appl. No.: 13/272,304

(22) Filed: Oct. 13, 2011

(65) Prior Publication Data

US 2012/0099066 A1   Apr. 26, 2012

(30) Foreign Application Priority Data

Oct. 21, 2010 (JP) .................................. 2010-236077

(51) Int. Cl.
*G02F 1/1333* (2006.01)

(52) U.S. Cl.
USPC .......................................... 349/138; 349/141

(58) Field of Classification Search
USPC ....................................................... 349/138
See application file for complete search history.

(56) References Cited

U.S. PATENT DOCUMENTS

2009/0009671 A1   1/2009   Wakabayashi
2009/0091697 A1*  4/2009   Ono et al. ...................... 349/138

FOREIGN PATENT DOCUMENTS

JP   2008-276172   11/2008

* cited by examiner

*Primary Examiner* — Lucy Chien
(74) *Attorney, Agent, or Firm* — Antonelli, Terry, Stout & Kraus, LLP.

(57) ABSTRACT

Provided is a liquid crystal display device (100), including a pixel electrode (Px) and a common electrode (CT) which are stacked via an insulating layer, one of the pixel electrode (Px) and the common electrode (CT) including slits (SL) formed therein, for aligning liquid crystal molecules by an electric field generated by the pixel electrode (Px) and the common electrode (CT), in which the insulating layer is formed so as to increase in thickness from a vicinity of ends (13a, 13b) in a longitudinal direction of the slits (SL) toward the ends (13a, 13b). Thus, the transmittance of the liquid crystal display device is improved.

16 Claims, 9 Drawing Sheets

LIQUID CRYSTAL DISPLAY DEVICE

CROSS-REFERENCE TO RELATED APPLICATION

The present application claims priority from Japanese application JP 2010-236077 filed on Oct. 21, 2010, the content of which is hereby incorporated by reference into this application.

BACKGROUND OF THE INVENTION

1. Field of the Invention

The present invention relates to a liquid crystal display device in which liquid crystal molecules are aligned by an electric field generated by two electrodes stacked via an insulating layer.

2. Description of the Related Art

Conventionally, liquid crystal display devices are classified into ones of a vertical electric field system and ones of a horizontal electric field system. A liquid crystal display device of the horizontal electric field system may obtain wider viewing angle characteristics compared with those of a liquid crystal display device of the vertical electric field system. Among liquid crystal display devices of the horizontal electric field system, ones in which a pixel electrode and a common electrode are stacked via an insulating layer, one of the electrodes having slits formed therein and the other of the electrodes being in the shape of an even plane without an opening, are used when high transmittance is required. This is because an arc-like electric flux is distributed to the vicinity of the center of the electrode having the slits formed therein so as to connect the pixel electrode and the common electrode which are in different layers.

By the way, examples of the electrode having slits formed therein include a comb electrode in which one ends of the slits are closed while the other ends are open, and an electrode in which both the ends of the slits are closed. Further, in a multi-domain liquid crystal display device, such slits in the electrode are inflected. When an electric field is generated by an electrode having slits formed therein and an electrode in the shape of an even plane without an opening, an electric field in the vicinity of ends in a longitudinal direction of the slits or in the vicinity of inflected portions of the slits is distributed in such a way that control of the alignment of the liquid crystal molecules is difficult. Therefore, a region in which the alignment of the liquid crystal molecules cannot be controlled (hereinafter, referred to as domain) is generated in the vicinity of the ends in the longitudinal direction of the slits or in the vicinity of the inflected portions of the slits. The domain is responsible for lowering the transmittance in the liquid crystal display device. Accordingly, as disclosed in, for example, Japanese Patent Application Laid-open No. 2008-276172, a liquid crystal display device which reduces such a domain has been proposed.

SUMMARY OF THE INVENTION

In the liquid crystal display device disclosed in Japanese Patent Application Laid-open No. 2008-276172, the number of ends of slits is reduced by providing the slits so as to extend continuously over a plurality of pixels. In other words, in the liquid crystal display device, the domain is reduced by reducing the number of ends of slits which are responsible for generation of the domain.

However, in the liquid crystal display device disclosed in Japanese Patent Application Laid-open No. 2008-276172, not all the ends of slits are eliminated, and thus, the problem that a domain generated in the vicinity of ends of slits lowers the transmittance is not solved.

The present invention has been made in view of the above, and an object of the present invention is to provide a liquid crystal display device which improves the transmittance.

In order to solve the above-mentioned problem and to achieve the object, according to a first aspect of the present invention, there is provided a liquid crystal display device, including a pixel electrode; and a common electrode generating an electric field to align liquid crystal molecules in cooperation with the pixel electrode; and an insulating layer which is stacked between the pixel electrode and the common electrode; wherein one of the pixel electrode and the common electrode included slits formed therein, and the insulating layer is formed so as to increase in thickness from a vicinity of ends in a longitudinal direction of the slits toward the ends.

Further, in the liquid crystal display device according to the first aspect of the present invention, the insulating layer may be formed so as to gradually increase in thickness from the vicinity of the ends in the longitudinal direction of the slits toward the ends.

Further, in the liquid crystal display device according to the first aspect of the present invention, the insulating layer may be processed to be inclined in advance so as to increase in thickness from the vicinity of the ends in the longitudinal direction of the slits toward the ends.

Further, in the liquid crystal display device according to the first aspect of the present invention, the vicinity of the ends in the longitudinal direction of the slits may be a domain generating region.

Further, in order to solve the above-mentioned problem and to achieve the object, according to a second aspect of the present invention, there is provided a liquid crystal display device, including a pixel electrode; a common electrode generating an electric field to align liquid crystal molecules in cooperation with the pixel electrode; and an insulating layer which is stacked between the pixel electrode and the common electrode; wherein one of the pixel electrode and the common electrode includes slits formed therein, and the slits are inflected, and the insulating layer is formed so as to increase in thickness from a vicinity of inflected portions of the slits toward the inflected portions.

Further, in the liquid crystal display device according to the second aspect of the present invention, the insulating layer may be formed so as to gradually increase in thickness from the vicinity of the inflected portions of the slits toward the inflected portions.

Further, in the liquid crystal display device according to the second aspect of the present invention, the insulating layer may be processed to be inclined in advance so as to increase in thickness from the vicinity of the inflected portions of the slits toward the inflected portions.

Further, in the liquid crystal display device according to the second aspect of the present invention, the vicinity of the inflected portions may be a domain generating region.

Further, in order to solve the above-mentioned problem and to achieve the object, according to a third aspect of the present invention, there is provided a liquid crystal display device, including a pixel electrode; a common electrode generating an electric field to align liquid crystal molecules in cooperation with the pixel electrode; and an insulating layer which is stacked between the pixel electrode and the common electrode; wherein one of the pixel electrode and the common electrode includes slits formed therein the slits are inflected, and the insulating layer is formed so as to increase in thickness from a vicinity of ends in a longitudinal direction of the slits toward the ends and is formed so as to increase in thickness from a vicinity of inflected portions of the slits toward the inflected portions.

Further, in the liquid crystal display device according to the third aspect of the present invention, the insulating layer may be formed so as to gradually increase in thickness from the vicinity of the ends in the longitudinal direction of the slits toward the ends and so as to gradually increase in thickness from the vicinity of the inflected portions of the slits toward the inflected portions.

Further, in the liquid crystal display device according to the third aspect of the present invention, the insulating layer may be processed to be inclined in advance so as to increase in thickness from the vicinity of the ends in the longitudinal direction of the slits toward the ends and so as to increase in thickness from the vicinity of the inflected portions of the slits toward the inflected portions.

Further, in the liquid crystal display device according to the third aspect of the present invention, the vicinity of the ends in the longitudinal direction of the slits and the vicinity of the inflected portions may be domain generating regions.

Further, in the liquid crystal display device according to the present invention, the one of the pixel electrode and the common electrode including the slits formed therein may be a comb electrode, and one of the ends in the longitudinal direction of the slits may be open while another end is closed.

Further, in the liquid crystal display device according to the present invention, the ends in the longitudinal direction of the slits may be closed.

In the liquid crystal display device according to the present invention in which the pixel electrode and the common electrode are stacked via the insulating layer, the slits are formed in one of the pixel electrode and the common electrode, and the liquid crystal molecules are aligned by an electric field generated by the pixel electrode and the common electrode, the insulating layer is formed so as to increase in thickness from the vicinity of the ends in the longitudinal direction of the slits toward the ends, to thereby lower the intensity of the electric field in the vicinity of the ends in the longitudinal direction of the slits. Because of the lowered intensity of the electric field, the liquid crystal molecules are normally aligned around the ends in the longitudinal direction of the slits and thus suppress enlargement of a domain which is generated by the electric field in the vicinity of the ends in the longitudinal direction of the slits. Therefore, the domain reduces, and, as a consequence, the transmittance may be improved.

Further, in the liquid crystal display device according to the present invention in which the pixel electrode and the common electrode are stacked via the insulating layer, the slits are formed in one of the pixel electrode and the common electrode, and the liquid crystal molecules are aligned by an electric field generated by the pixel electrode and the common electrode, the slits are formed so as to be inflected, and the insulating layer is formed so as to increase in thickness from the vicinity of the inflected portions of the slits toward the inflected portions, to thereby lower the intensity of the electric field in the vicinity of the inflected portions of the slits. Because of the lowered intensity of the electric field, the liquid crystal molecules are normally aligned around the inflected portions of the slits and thus suppress enlargement of a domain which is generated by the electric field in the vicinity of the inflected portions of the slits. Therefore, the domain reduces, and, as a consequence, the transmittance may be improved.

Further, in the liquid crystal display device according to the present invention in which the pixel electrode and the common electrode are stacked via the insulating layer, the slits are formed in one of the pixel electrode and the common electrode, and the liquid crystal molecules are aligned by an electric field generated by the pixel electrode and the common electrode, the slits are formed so as to be inflected, the insulating layer is formed so as to increase in thickness from the ends in the longitudinal direction of the slits toward the ends, and the insulating layer is formed so as to increase in thickness from the vicinity of the inflected portions of the slits toward the inflected portions, to thereby lower the intensity of the electric field in the vicinity of the ends in the longitudinal direction of the slits and in the vicinity of the inflected portions. Because of the lowered intensity of the electric field, the liquid crystal molecules are normally aligned around the ends in the longitudinal direction of the slits and around the inflected portions and thus suppress enlargement of a domain which is generated by the electric field in the vicinity of the ends in the longitudinal direction of the slits and in the vicinity of the inflected portions. Therefore, the domain reduces, and, as a consequence, the transmittance may be improved.

DETAILED DESCRIPTION OF THE INVENTION

Liquid crystal display devices according to preferred embodiments of the present invention are described in detail in the following with reference to the attached drawings.

[First Embodiment]

Figure 1:
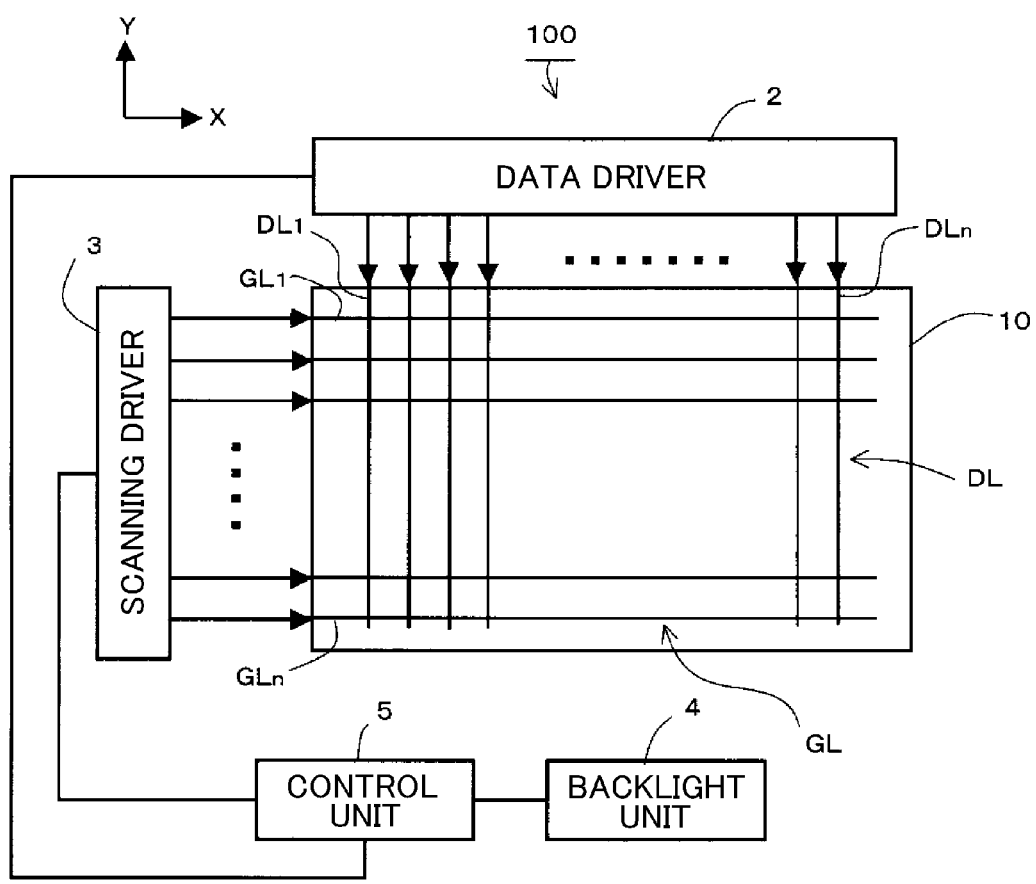
FIG. 1 is a schematic view illustrating a structure of a liquid crystal display device according to a first embodiment of the present invention.
Figure 2:
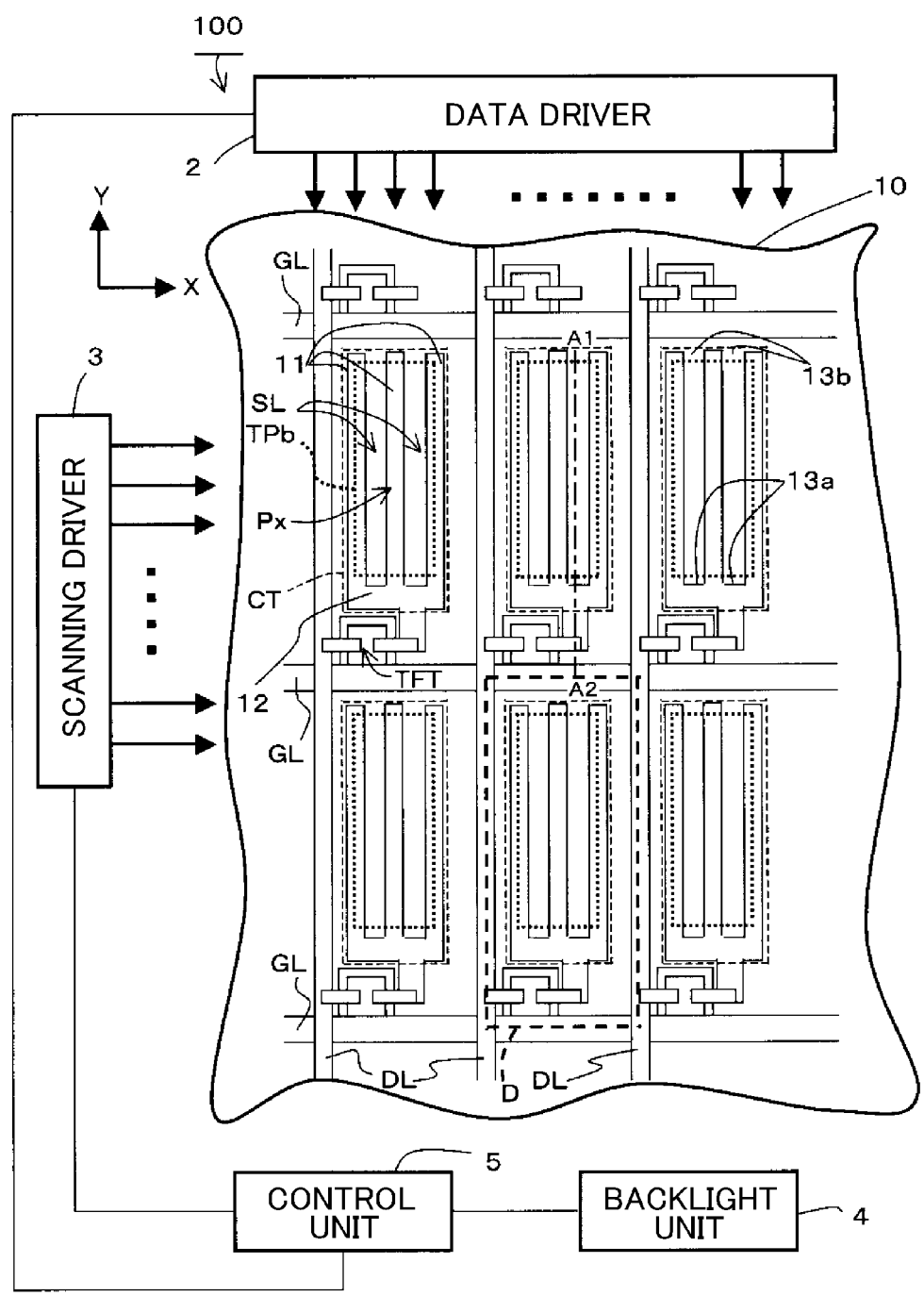
FIG. 2 is a detailed explanatory diagram of a structure of a liquid crystal display panel illustrated in FIG. 1.
Figure 3:
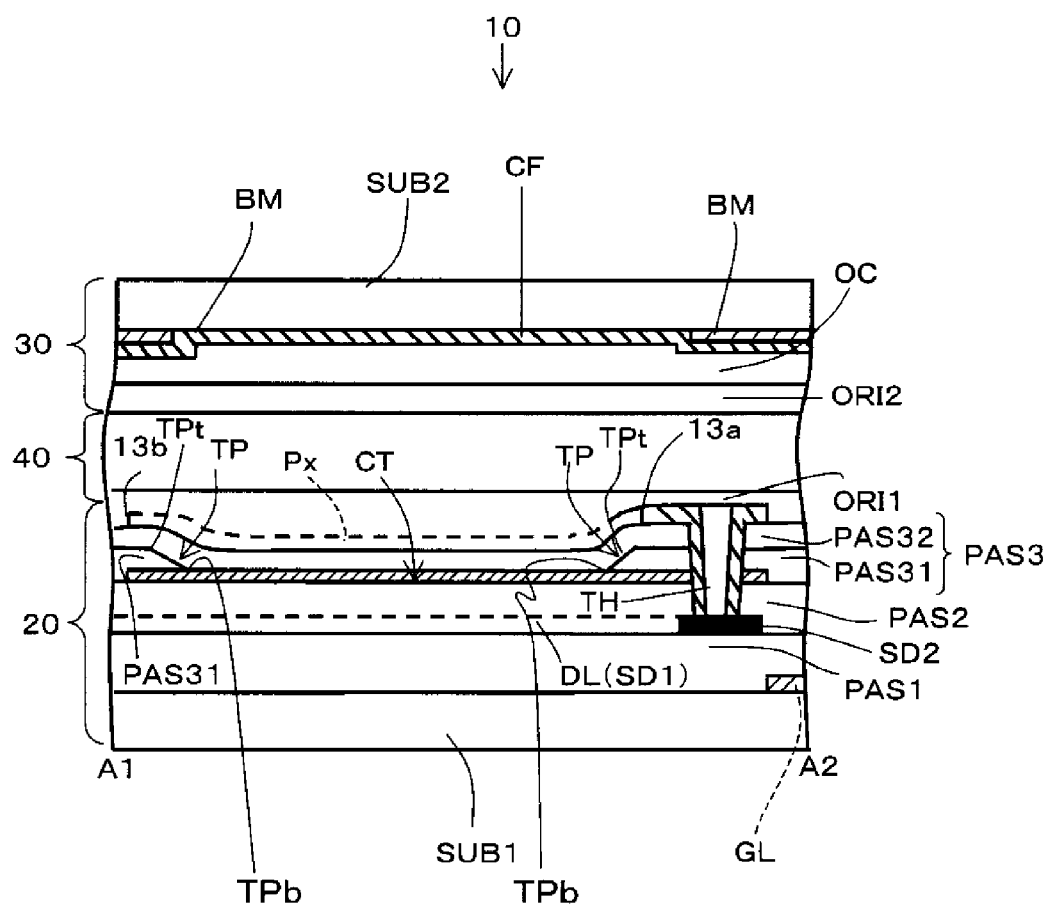
FIG. 3 is a cross-sectional view of the liquid crystal display panel taken along the line A1-A2 of FIG. 2.

FIG. 1 is a schematic view illustrating a structure of a liquid crystal display device 100 according to a first embodiment of the present invention. FIG. 2 is a detailed explanatory diagram of a structure of a liquid crystal display panel 10 illustrated in FIG. 1. In FIG. 2, the part of a liquid crystal display panel 10 is enlarged to explain the structure of pixels. FIG. 3 is a cross-sectional view of the liquid crystal display panel 10 taken along the line A1-A2 of FIG. 2. The liquid crystal display device 100 is of the horizontal electric field system, and includes the liquid crystal display panel 10, a data driver 2, a scanning driver 3, a backlight unit 4, and a control unit 5.

As illustrated in FIG. 1, the liquid crystal display panel 10 includes a plurality of video signal lines DL (DL$_1$, ..., DL$_n$, where n is a natural number) which extend in a Y direction and a plurality of scanning signal lines GL (GL$_1$, ..., GL$_m$, where m is a natural number) which extend in an X direction. Further, in the liquid crystal display panel 10, the plurality of scanning signal lines GL are formed so as to be in parallel to one another, and each of the plurality of video signal lines DL is formed so as to cross the scanning signal lines GL. A pixel D is formed in a region surrounded by those video signal lines DL and scanning signal lines GL.

As illustrated in FIG. 3, a liquid crystal material 40 containing liquid crystal molecules is sealed between a TFT substrate 20 and a counter substrate 30 in the liquid crystal display panel 10. The TFT substrate 20 is a substrate including an insulating substrate such as a glass substrate, and the scanning signal lines GL, the video signal lines DL, thin film transistors TFTs, a common electrode CT, and pixel electrodes Px provided thereon. More specifically, the TFT substrate 20 has the scanning signal lines GL provided on an insulating substrate SUB1 such as a glass substrate. The scanning signal lines GL are formed by, for example, etching a film of a conductor such as aluminum.

The video signal line DL (source electrode SD1) and a drain electrode SD2 of the thin film transistor TFT are provided above the scanning signal line GL via a first insulating layer PAS1.

The common electrode CT is provided above the video signal line DL and the like via a second insulating layer PAS2. The common electrode CT is formed by etching a film of a conductor having high light transmittance such as ITO, and is formed in the shape of an even plane without an opening in a region which overlaps the pixel electrode Px in plan view. The pixel electrode Px is provided above the common electrode CT via a third insulating layer PAS3.

The pixel electrode Px is formed by etching a film of a conductor having high light transmittance such as ITO. The pixel electrode Px is connected to the drain electrode SD2 via a through hole TH. The pixel electrode Px has a plurality of slits SL formed in the region overlapping the common electrode CT in plan view, the slits SL having the long sides in a direction in which the video signal lines DL extend. The pixel electrode Px is a comb electrode, and one ends of the slits SL are open while the other ends of the slits SL are closed.

As illustrated in FIG. 2, the pixel electrode Px has a plurality of strip-like portions 11 formed in stripes and a joining portion 12 for joining one ends of the plurality of strip-like portions 11 together. The joining portion 12 is connected to the drain electrode SD2. The slits SL of the pixel electrode Px are formed by the strip-like portions 11 and the joining portion 12.

The slits SL each have a closed end 13a and an open end 13b. The closed end 13a is an end closed by the joining portion 12 of the ends in the longitudinal direction of the slit SL. The distribution of an electric field in the vicinity of the closed ends 13a is affected not only by the strip-like portions 11 but also by the joining portion 12. Specifically, the vicinity of the closed ends 13a is a domain generating region. The open end 13b is an open end of the ends in the longitudinal direction of the slit SL. The distribution of an electric field in the vicinity of the open ends 13b is affected by tip portions of the strip-like portions 11. Specifically, the vicinity of the open ends 13b is a domain generating region.

As illustrated in FIG. 3, in the counter substrate 30, a light shielding film BM called a black matrix and a color filter CF are provided on a surface of an insulating substrate SUB2 such as a glass substrate. The light shielding film BM is formed by, for example, etching a conductive film or an insulating film having a light transmittance of almost zero to form a lattice-like pattern for separating the respective pixels D from one another. The color filter CF is formed by, for example, etching or exposing to light and developing an insulating film and periodically arranging a filter for displaying red (R), a filter for displaying green (G), and a filter for displaying blue (B) in an aperture region of the light shielding film. Further, an alignment film ORI2 is provided above the light shielding film BM and the color filter CF via, for example, an overcoating layer OC.

The data driver 2 generates video signals (gradation voltages) to be input to the plurality of video signal lines DL, respectively.

The scanning driver 3 sequentially inputs scanning signals to the plurality of scanning signal lines GL. The data driver 2 and the scanning driver 3 are electrically connected to the liquid crystal display panel 10 via a flexible board or the like (not shown) connected to an outer peripheral portion of the liquid crystal display panel 10.

The backlight unit 4 is materialized by a light-emitting diode or the like, and irradiates light from a back surface side of the liquid crystal display panel 10.

The control unit 5 is materialized by a CPU or the like, and is electrically connected to respective portions of the liquid crystal display device 100 including the data driver 2, the scanning driver 3, and the backlight unit 4, for controlling the overall operation of the liquid crystal display device 100. The control unit 5 includes a memory or the like (not shown) for temporarily holding video data which is input from an external system.

Here, the third insulating layer PAS3 is specifically described. As illustrated in FIG. 3, the third insulating layer PAS3 has a first inclination layer PAS31 and a second inclination layer PAS32.

The first inclination layer PAS31 is an insulating layer formed on the common electrode CT. The first inclination layer PAS31 has an inclined portion TP. The inclined portion TP is a portion of the first inclination layer PAS31 which is processed so as to form an inclined surface. The first inclination layer PAS31 starts its inclination at a bottom end TPb of the inclined portion TP and ends its inclination at a top end TPt. The inclined portion TP is processed in advance before the second inclination layer PAS32 is stacked thereon.

The inclined portion TP is inclined at a predetermined inclination angle with respect to a surface of the common electrode CT. For example, the inclined portion TP is inclined at an inclination angle of 10 degrees with respect to the surface of the common electrode CT. Note that, the inclination angle of the inclined portion TP is not limited to 10 degrees. In other words, the inclination angle may be appropriately set depending on the domain generating region. The first inclination layer PAS31 is processed to be inclined so as to gradually increase in thickness from the vicinity of the closed ends 13a toward the closed ends 13a and so as to gradually increase in thickness from the vicinity of the open ends 13b toward the open ends 13b.

The second inclination layer PAS32 is an insulating layer formed on the first inclination layer PAS31 after the first inclination layer PAS31 is processed to be inclined as described above.

The third insulating layer PAS3 is formed by the first inclination layer PAS31 which is processed to be inclined and the second inclination layer PAS32 which is stacked on the first inclination layer PAS31, so as to gradually increase in thickness from the vicinity of the closed ends 13a toward the closed ends 13a and so as to gradually increase in thickness from the vicinity of the open ends 13b toward the open ends 13b. Therefore, in the vicinity of the closed ends 13a and in the vicinity of the open ends 13b, that is, in the domain generating regions, the intensity of the electric field generated by the pixel electrode Px and the common electrode CT becomes lower. Further, the intensity of the electric field changes so as to be gradually lowered toward the closed ends 13a and toward the open ends 13b, and thus, control of the alignment of the liquid crystal molecules is not adversely affected.

Note that, it is desired that the third insulating layer PAS3 gradually increase in thickness, but it is enough that the control of the alignment of the liquid crystal molecules is not adversely affected. For example, it is enough that the third insulating layer PAS3 increases in thickness from the vicinity of the closed ends 13a toward the closed ends 13a and from the vicinity of the open ends 13b toward the open ends 13b, respectively.

In the first embodiment of the present invention, the third insulating layer PAS3 is formed so as to gradually increase in thickness from the vicinity of the closed ends 13a toward the closed ends 13a and is formed so as to gradually increase in thickness from the vicinity of the open ends 13b toward the open ends 13b, to thereby lower the intensity of the electric field in the vicinity of the closed ends 13a and in the vicinity of the open ends 13b. Because of the lowered intensity of the electric field, liquid crystal molecules are normally aligned in the vicinity of the closed ends 13a and in the vicinity of the open ends 13b and thus suppress enlargement of a domain which is generated by the electric field in the vicinity of the closed ends 13a and in the vicinity of the open ends 13b. Therefore, the domain reduces, and, as a consequence, the transmittance may be improved.

Further, in the first embodiment of the present invention, the liquid crystal molecules which are normally aligned in the vicinity of the closed ends 13a and in the vicinity of the open ends 13b due to the lowered intensity of the electric field in the vicinity of the closed ends 13a and in the vicinity of the open ends 13b suppress the enlargement of the domain which is generated by the electric field in the vicinity of the closed ends 13a and in the vicinity of the open ends 13b, and thus, even when the screen of the liquid crystal display panel 10 is pressed, the enlargement of the domain may be suppressed and time necessary for the screen to return to its original state may be shortened.

[Second Embodiment]

Figure 4:
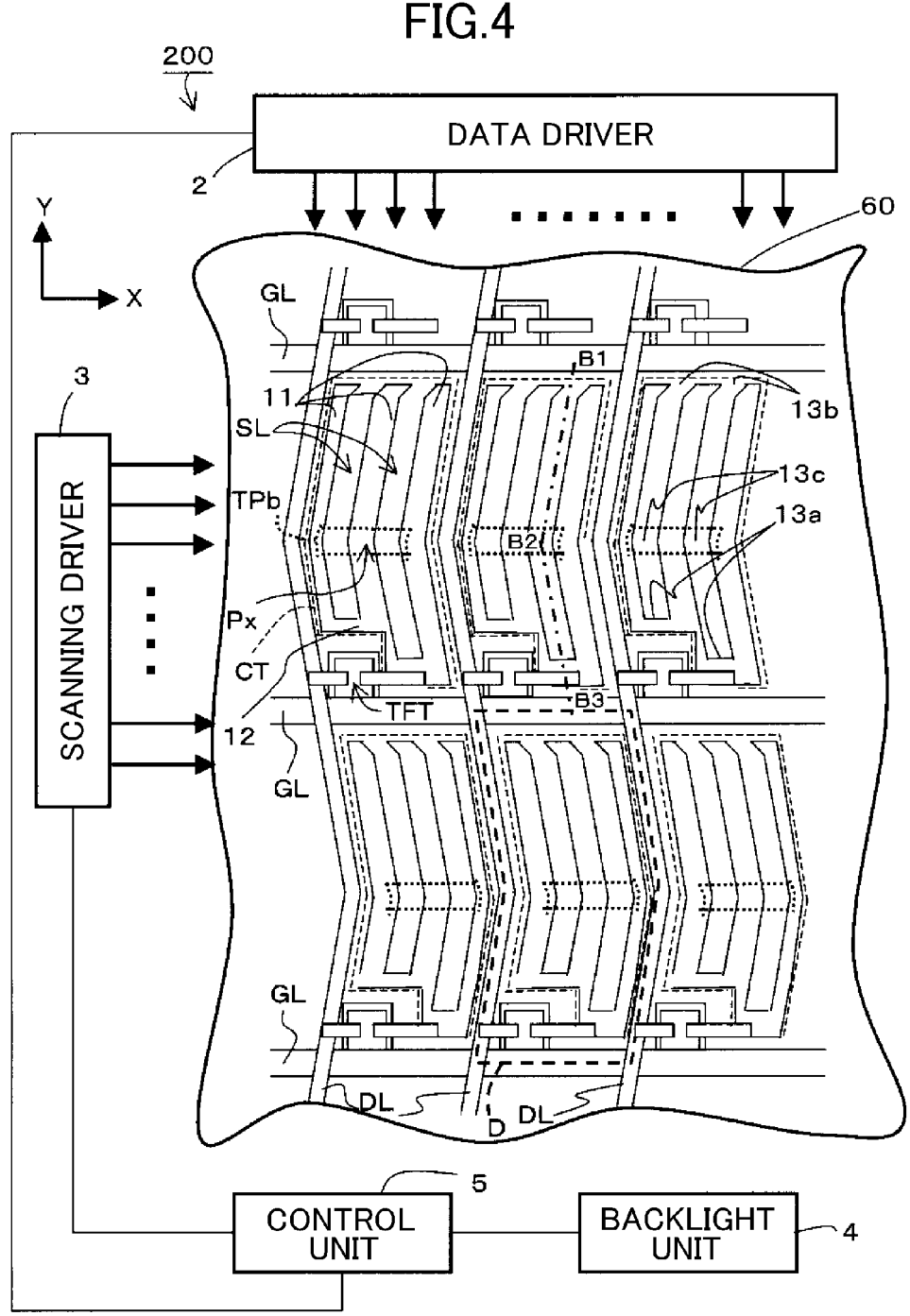
FIG. 4 is a detailed explanatory diagram of a structure of a liquid crystal display panel of a liquid crystal display device according to a second embodiment of the present invention.
Figure 5:
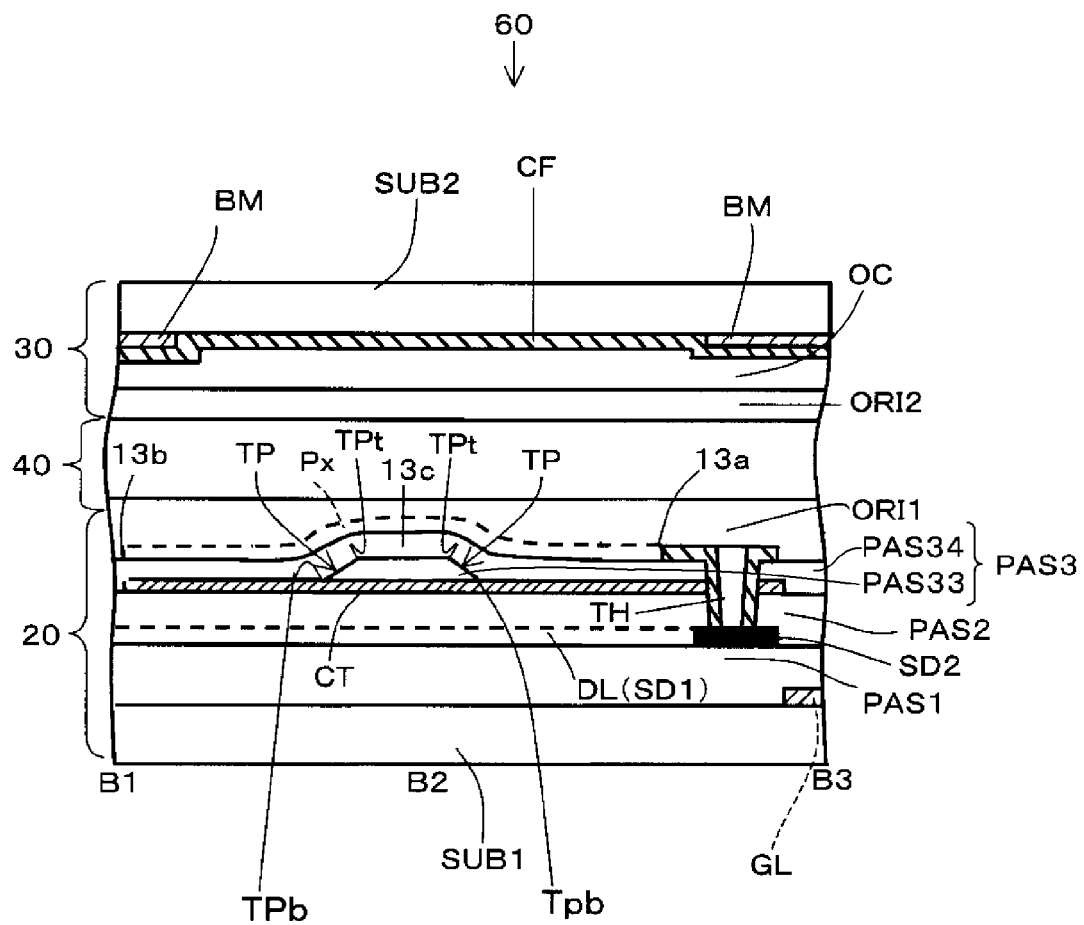
FIG. 5 is a cross-sectional view of the liquid crystal display panel taken along the line B1-B2-B3 of FIG. 4.

Next, a second embodiment of the present invention is described with reference to FIG. 4 and FIG. 5. FIG. 4 is a detailed explanatory diagram of a structure of a liquid crystal display panel 60 of a liquid crystal display device 200 according to the second embodiment of the present invention. FIG. 5 is a cross-sectional view of the liquid crystal display panel 60 taken along the line B1-B2-B3 of FIG. 4. In the first embodiment of the present invention, the slits SL are in the shape of straight lines, but, in the second embodiment, the slits SL each have a inflected portion 13c. The third insulating layer PAS3 is formed so as to gradually increase in thickness from the vicinity of the inflected portions 13c toward the inflected portions 13c. Other structures in the second embodiment are the same as those in the first embodiment, and like reference symbols are used to designate like structural elements.

As illustrated in FIG. 4, a pixel electrode Px has a plurality of strip-like portions 11 formed in stripes and a joining portion 12 for joining one ends of the plurality of strip-like portions 11 together. The strip-like portions 11 are inflected so as to be V-shaped. In the pixel electrode Px, the slits SL which are inflected to be V-shaped are formed by the strip-like portions 11 and the joining portion 12.

The inflected portions 13c correspond to the inflected shape of the pixel electrode Px. Such V-shaped slits SL are widely employed in multi-domain liquid crystal display devices. The distribution of an electric field in the vicinity of the inflected portions 13c is affected by the inflected shape. Specifically, the vicinity of the inflected portions 13c is a domain generating region. As illustrated in FIG. 5, an alignment film ORI1 is provided on the pixel electrode Px. Note that, the shape of the slits SL is not limited to being inflected so as to be V-shaped. It is enough that the slits SL have inflected portions which accommodate a multi-domain liquid crystal display device.

Here, the third insulating layer PAS3 is specifically described. As illustrated in FIG. 5, the third insulating layer PAS3 has a first inclination layer PAS33 and a second inclination layer PAS34.

The first inclination layer PAS33 is an insulating layer formed on the common electrode CT. The first inclination layer PAS33 is processed to be inclined so as to gradually increase in thickness from the vicinity of the inflected portions 13c of the slits SL toward the inflected portions 13c.

The second inclination layer PAS34 is an insulating layer formed on the first inclination layer PAS33 after the first inclination layer PAS33 is processed to be inclined as described above.

The third insulating layer PAS3 is formed by the first inclination layer PAS33 which is processed to be inclined and the second inclination layer PAS34 which is stacked on the first inclination layer PAS33, so as to gradually increase in thickness from the vicinity of the inflected portions 13c of the slits SL toward the inflected portions 13c. Therefore, in the vicinity of the inflected portions 13c, that is, in the domain generating region, the intensity of the electric field generated by the pixel electrode Px and the common electrode CT becomes lower. Further, the intensity of the electric field changes so as to be gradually lowered toward the inflected portions 13c, and thus, control of the alignment of the liquid crystal molecules is not adversely affected.

In the second embodiment of the present invention, the third insulating layer PAS3 is formed so as to gradually increase in thickness from the vicinity of the inflected portions 13c toward the inflected portions 13c, to thereby lower the intensity of the electric field in the vicinity of the inflected portions 13c. Because of the lowered intensity of the electric field, liquid crystal molecules are normally aligned in the vicinity of the inflected portions 13c and thus suppress enlargement of a domain which is generated by the electric field in the vicinity of the inflected portions 13c. Therefore, the domain reduces, and, as a consequence, the transmittance may be improved.

Further, in the second embodiment of the present invention, the pixel electrode Px is inflected, and thus, restrictions on the viewing angle may be eased.

[Third Embodiment]

Figure 6:
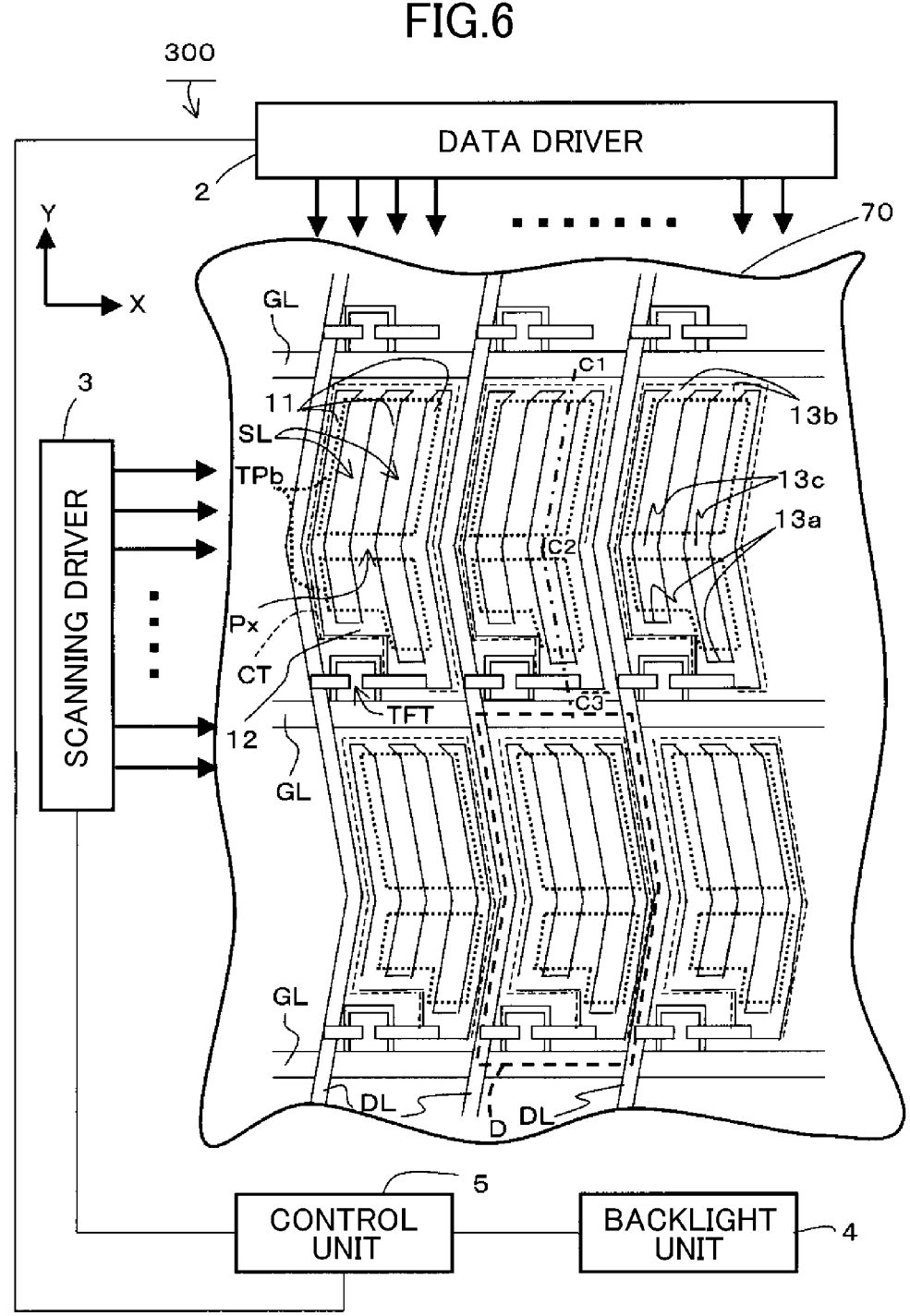
FIG. 6 is a detailed explanatory diagram of a structure of a liquid crystal display panel of a liquid crystal display device according to a third embodiment of the present invention.
Figure 7:
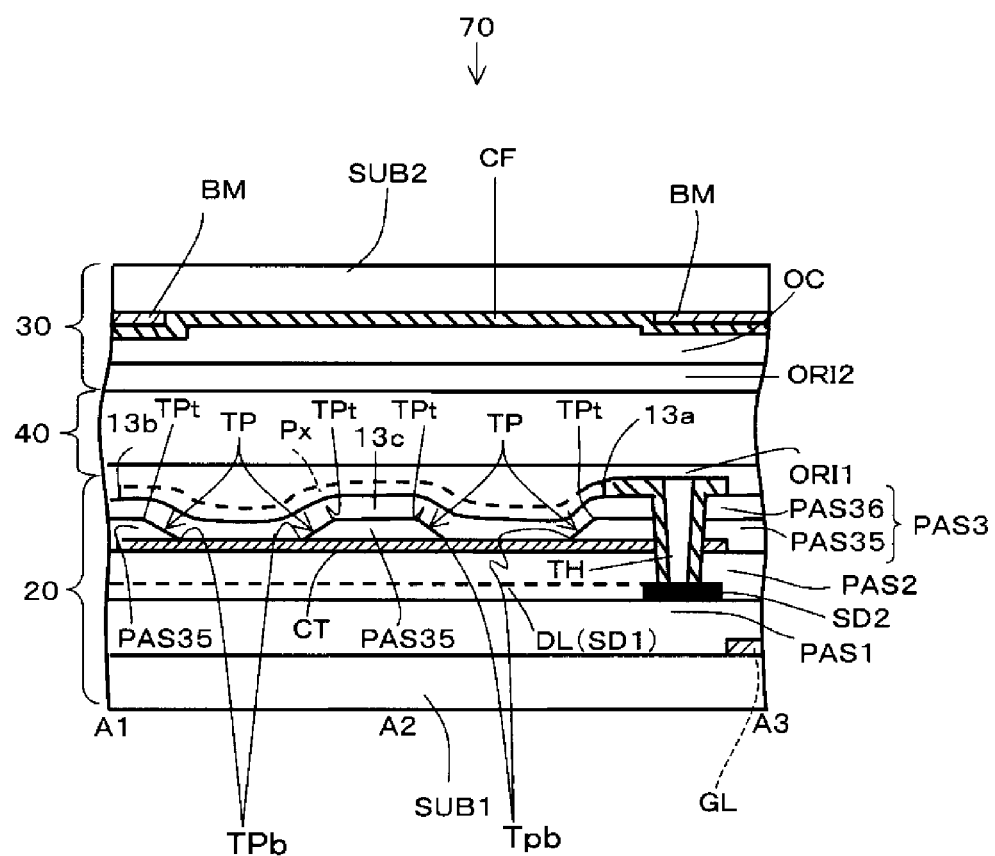
FIG. 7 is a cross-sectional view of the liquid crystal display panel taken along the line C1-C2-C3 of FIG. 6.

Next, a third embodiment of the present invention is described with reference to FIG. 6 and FIG. 7. FIG. 6 is a detailed explanatory diagram of a structure of a liquid crystal display panel 70 of a liquid crystal display device 300 according to the third embodiment of the present invention. FIG. 7 is a cross-sectional view of the liquid crystal display panel 70 taken along the line C1-C2-C3 of FIG. 6. In the second embodiment of the present invention, the third insulating layer PAS3 is formed so as to gradually increase in thickness from the vicinity of the inflected portions 13c toward the inflected portions 13c. In the third embodiment, further, the third insulating layer PAS3 is formed so as to gradually increase in thickness from the vicinity of the closed ends 13a toward the closed ends 13a and is formed so as to gradually increase in thickness from the vicinity of the open ends 13b toward the open ends 13b. Other structures in the third embodiment are the same as those in the second embodiment, and like reference symbols are used to designate like structural elements.

Here, the third insulating layer PAS3 is specifically described. As illustrated in FIG. 7, the third insulating layer PAS3 has a first inclination layer PAS35 and a second inclination layer PAS36.

The first inclination layer PAS35 is processed to be inclined so as to gradually increase in thickness from the vicinity of the closed ends 13a toward the closed ends 13a and so as to gradually increase in thickness from the vicinity of the open ends 13b toward the open ends 13b. Further, the first inclination layer PAS35 is processed to be inclined so as to gradually increase in thickness from the vicinity of the inflected portions 13c toward the inflected portions 13c.

The second inclination layer PAS36 is an insulating layer formed on the first inclination layer PAS35 after the first inclination layer PAS35 is processed to be inclined as described above.

The third insulating layer PAS3 is formed by the first inclination layer PAS35 which is processed to be inclined and the second inclination layer PAS36 which is stacked on the first inclination layer PAS35, so as to gradually increase in thickness from the vicinity of the closed ends 13a toward the closed ends 13a and so as to gradually increase in thickness from the vicinity of the open ends 13b toward the open ends 13b. Further, the third insulating layer PAS3 is formed so as to gradually increase in thickness from the vicinity of the inflected portions 13c toward the inflected portions 13c. Therefore, in the vicinity of the closed ends 13a, in the vicinity of the open ends 13b, and in the vicinity of the inflected portions 13c, that is, in the domain generating regions, the intensity of the electric field generated by the pixel electrode Px and the common electrode CT becomes lower. Further, the intensity of the electric field changes so as to be gradually lowered toward the closed ends 13a, toward the open ends 13b, and toward the inflected portions 13c, and thus, control of the alignment of the liquid crystal molecules is not adversely affected.

In the third embodiment of the present invention, the third insulating layer PAS3 is formed so as to gradually increase in thickness from the vicinity of the inflected portions 13c toward the inflected portions 13c, to thereby obtain the same effect as that in the second embodiment, and is formed so as to gradually increase in thickness from the vicinity of the closed ends 13a toward the closed ends 13a and so as to gradually increase in thickness from the vicinity of the open ends 13b toward the open ends 13b, to thereby lower the intensity of the electric field in the vicinity of the closed ends 13a and in the vicinity of the open ends 13b. Because of the lowered intensity of the electric field, liquid crystal molecules are normally aligned in the vicinity of the closed ends 13a and in the vicinity of the open ends 13b and thus suppress enlargement of a domain which is generated by the electric field in the vicinity of the closed ends 13a and in the vicinity of the open ends 13b. Therefore, the domain reduces, and, as a consequence, the transmittance may be improved.

[Fourth Embodiment]

Figure 8:
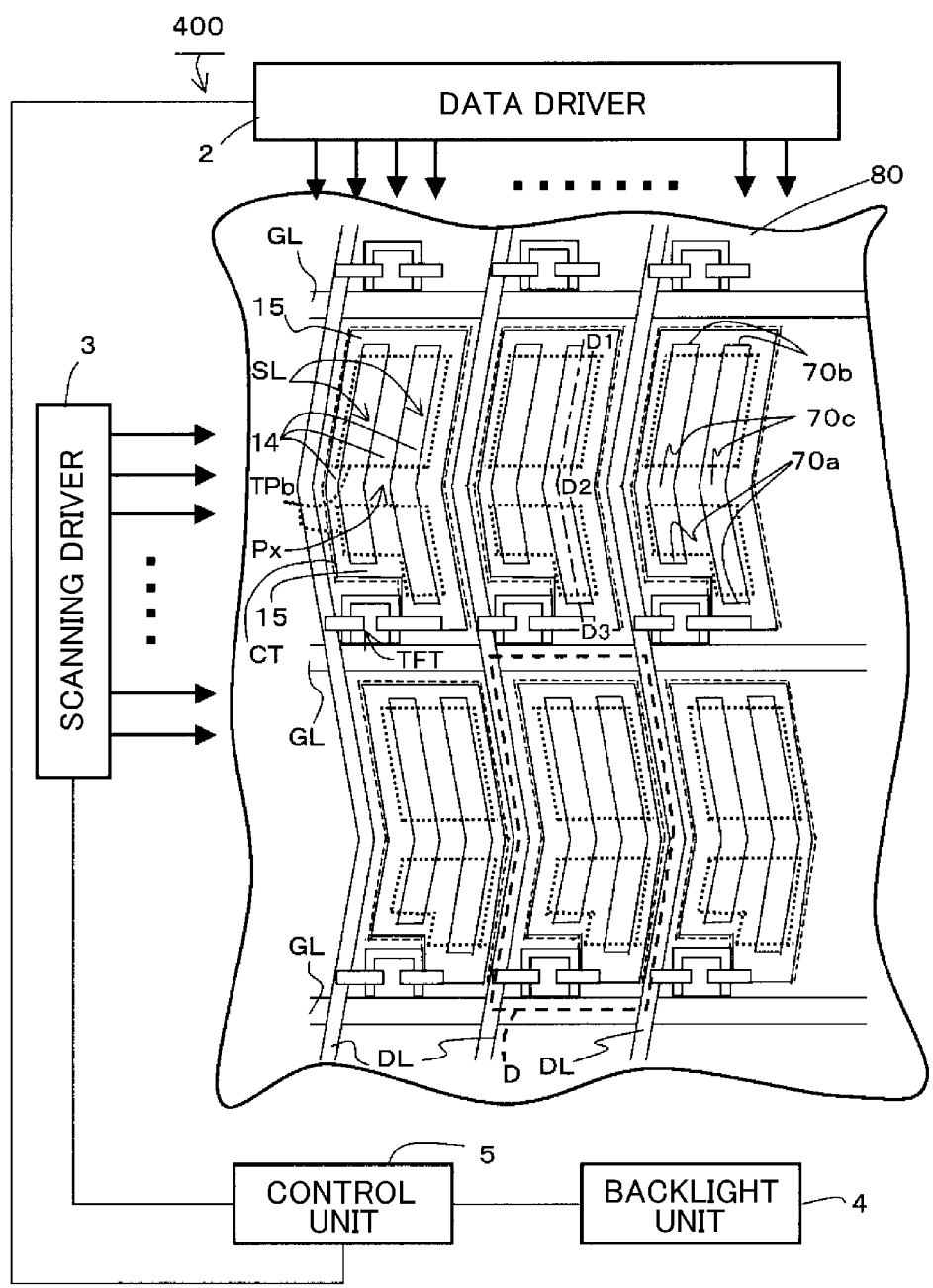
FIG. 8 is a detailed explanatory diagram of a structure of a liquid crystal display panel of a liquid crystal display device according to a fourth embodiment of the present invention.
Figure 9:
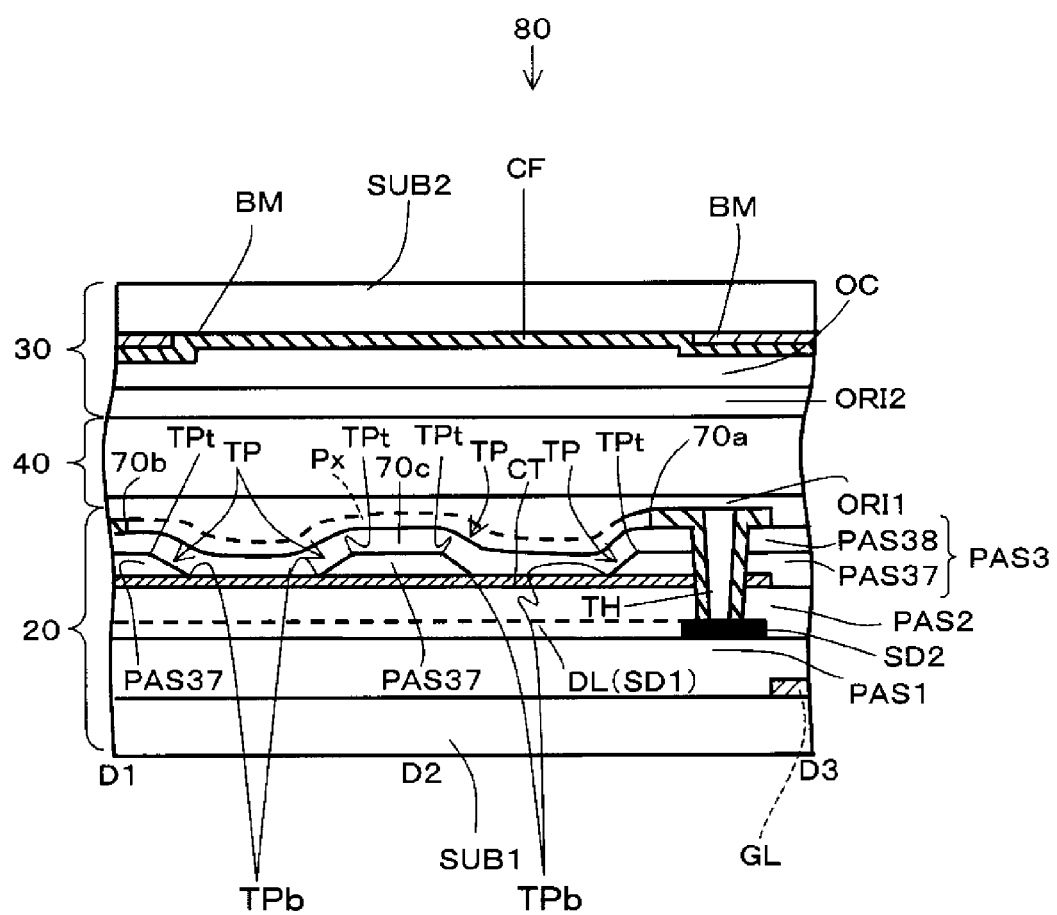
FIG. 9 is a cross-sectional view of the liquid crystal display panel taken along the line D1-D2-D3 of FIG. 8.

Next, a fourth embodiment of the present invention is described with reference to FIG. 8 and FIG. 9. FIG. 8 is a detailed explanatory diagram of a structure of a liquid crystal display panel 80 of a liquid crystal display device 400 according to the fourth embodiment of the present invention. FIG. 9 is a cross-sectional view of the liquid crystal display panel 80 taken along the line D1-D2-D3 of FIG. 8. In the third embodiment, the pixel electrode Px of the liquid crystal display panel 70 is a comb electrode in which one ends of both ends in the longitudinal direction of the slits SL are open, but, in the fourth embodiment, the pixel electrode Px of the liquid crystal display panel 80 is an electrode in which both ends in the longitudinal direction of the slits SL are closed.

As illustrated in FIG. 8, the pixel electrode Px has a plurality of strip-like portions 14 formed in stripes and joining portions 15 each for joining ends of the plurality of strip-like portions 14 together on one side. The slits SL of the pixel electrode Px are formed by the strip-like portions 14 and the joining portions 15.

The slits SL each have closed ends 70a and 70b and a inflected portion 70c. The closed ends 70a and 70b are ends closed by the joining portions 15. The distribution of an electric field in the vicinity of the closed ends 70a and 70b is affected not only by the strip-like portions 14 but also by the joining portions 15. Specifically, the vicinities of the closed ends 70a and 70b are domain generating regions. The inflected portions 70c correspond to the inflected shape of the pixel electrode Px. The distribution of an electric field in the vicinity of the inflected portions 70c is affected by the inflected shape. Specifically, the vicinity of the inflected portions 70c is a domain generating region. Further, as illustrated in FIG. 9, the third insulating layer PAS3 has a first inclination layer PAS37 and a second inclination layer PAS38. Other structures in the fourth embodiment are the same as those in the third embodiment, and like reference symbols are used to designate like structural elements.

As illustrated in FIG. 9, the first inclination layer PAS37 is processed to be inclined so as to gradually increase in thickness from the vicinity of the closed ends 70a toward the closed ends 70a and so as to gradually increase in thickness from the vicinity of the closed ends 70b toward the closed ends 70b. Further, the third insulating layer PAS3 is processed to be inclined so as to gradually increase in thickness from the vicinity of the inflected portions 70c toward the inflected portions 70c. The second inclination layer PAS38 is an insulating layer formed on the first inclination layer PAS37 after the first inclination layer PAS37 is processed to be inclined as described above.

The third insulating layer PAS3 is formed by the first inclination layer PAS37 which is processed to be inclined and the second inclination layer PAS38 which is stacked on the first inclination layer PAS37, so as to gradually increase in thickness from the vicinity of the closed ends 70a toward the closed ends 70a and so as to gradually increase in thickness from the vicinity of the closed ends 70b to the closed ends 70b. Further, the third insulating layer PAS3 is processed to be inclined so as to gradually increase in thickness from the vicinity of the inflected portions 70c toward the inflected portions 70c.

In the fourth embodiment of the present invention, the insulating layer PAS3 is formed so as to gradually increase in thickness from the vicinity of the closed ends 70a toward the closed ends 70a, so as to gradually increase in thickness from the vicinity of the closed ends 70b toward the closed ends 70b, and further so as to gradually increase in thickness from the vicinity of the inflected portions 70c toward the inflected portions 70c, to thereby lower the intensity of the electric field in the vicinities of the closed ends 70a and 70b and in the vicinity of the inflected portions 70c. Because of the lowered intensity of the electric field, liquid crystal molecules are normally aligned in the vicinities of the closed ends 70a and 70b and in the vicinity of the inflected portions 70c and thus suppress enlargement of a domain which is generated by the electric field in the vicinities of the closed ends 70a and 70b and in the vicinity of the inflected portions 70c. Therefore, even when the pixel electrode Px is a pixel electrode in which both ends of the slits SL are closed, the transmittance may be improved.

Note that, in the first to fourth embodiments of the present invention, the longitudinal direction of the slits SL is the direction in which the video signal lines DL extend, but the present invention is not limited thereto. For example, the longitudinal direction of the slits SL may be a direction in which the scanning signal lines GL extend.

Further, in the first to fourth embodiments of the present invention, the pixel electrode Px is provided above the common electrode CT, but the present invention is not limited thereto. For example, the arrangement may be upside down in which the pixel electrode Px is provided below the common electrode CT.

Further, in the first to fourth embodiments of the present invention, the pixel electrode Px has the slits SL formed therein and the common electrode CT is in the shape of an even plane without an opening, but the present invention is not limited thereto. For example, the pixel electrode Px may be in the shape of an even plane without an opening and the common electrode CT may have the slits SL formed therein.

Further, in the first to fourth embodiments of the present invention, the third insulating layer PAS3 is gradually increased in thickness by processing the first inclination layer PAS31, PAS33, PAS35, or PAS37 to be inclined in advance, but the present invention is not limited thereto. It is enough that the third insulating layer PAS3 gradually increases in thickness from the vicinities of ends of the slits SL toward the ends of the slits SL or from the vicinity of the inflected portions of the slits SL toward the inflected portions. For example, the third insulating layer PAS3 may have a single-layer structure and the single-layer-structured third insulating layer PAS3 may be processed to be inclined in advance.

Further, in the first, second, and fourth embodiments of the present invention, the third insulating layer PAS3 is gradually increased in thickness toward both the ends of the slits SL, but the present invention is not limited thereto. For example, the third insulating layer PAS3 may gradually increase in thickness only toward one ends of the slits SL.

Further, in the fourth embodiment of the present invention, the slits SL are inflected, but the present invention is not limited thereto, and the slits SL may be in the shape of straight lines.

Note that, the present invention is not limited to the first to fourth embodiments of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a pixel electrode;
   a common electrode generating an electric field to align liquid crystal molecules in cooperation with the pixel electrode; and
   an insulating layer which is stacked between the pixel electrode and the common electrode;
   wherein one of the pixel electrode and the common electrode includes slits formed therein, the slits of the one of the pixel electrode and the common electrode extending in parallel to each other in an extending direction; and
   wherein the insulating layer in a region of the slits is formed so as to increase in thickness in the extending direction of the slits from a vicinity of ends of the slits toward the ends of the slits.

2. The liquid crystal display device according to claim 1, wherein the insulating layer is formed so as to gradually increase in thickness in the extending direction of the slits from the vicinity of the ends of the slits toward the ends of the slits.

3. The liquid crystal display device according to claim 1, wherein the insulating layer is processed to be inclined in advance so as to increase in thickness in the extending direction of the slits from the vicinity of the ends of the slits toward the ends of the slits.

4. The liquid crystal display device according to claim 1, wherein the vicinity of the ends of the slits in the extending direction of the slits is a domain generating region.

5. A liquid crystal display device comprising:
   a pixel electrode;
   a common electrode generating an electric field to align liquid crystal molecules in cooperation with the pixel electrode; and
   an insulating layer which is stacked between the pixel electrode and the common electrode; wherein:
   one of the pixel electrode and the common electrode includes slits formed therein, the slits of the one of the pixel electrode and the common electrode extending in parallel to each other in an extending direction;
   the slits have inflected portions along the extending direction of the slits; and
   the insulating layer in a region of the slits is formed so as to increase in thickness in the extending direction of the slits from a vicinity of the inflected portions of the slits toward the inflected portions of the slits.

6. The liquid crystal display device according to claim 5, wherein the insulating layer is formed so as to gradually increase in thickness in the extending direction of the slits from the vicinity of the inflected portions of the slits toward the inflected portions of the slits.

7. The liquid crystal display device according to claim 5, wherein the insulating layer is processed to be inclined in advance so as to increase in thickness in the extending direction of the slits from the vicinity of the inflected portions of the slits toward the inflected portions of the slits.

8. The liquid crystal display device according to claim 5, wherein the vicinity of the inflected portions of the slits is a domain generating region.

9. A liquid crystal display device comprising
   a pixel electrode;
   a common electrode generating an electric field to align liquid crystal molecules in cooperation with the pixel electrode; and
   an insulating layer which is stacked between the pixel electrode and the common electrode; wherein:
   one of the pixel electrode and the common electrode includes slits formed therein, the slits of the one of the pixel electrode and the common electrode extending in parallel to each other in an extending direction;
   the slits have inflected portions along the extending direction of the slits; and
   the insulating layer in a region of the slits is formed so as to increase in thickness in the extending direction of the slits from a vicinity of ends of the slits toward the ends of the slits and is formed so as to increase in thickness in the extending direction of the slits from a vicinity of the inflected portions of the slits toward the inflected portions of the slits.

10. The liquid crystal display device according to claim 9, wherein the insulating layer is formed so as to gradually increase in thickness in the extending direction of the slits from the vicinity of the ends of the slits toward the ends of the slits and so as to gradually increase in thickness from the vicinity of the inflected portions of the slits toward the inflected portions of the slits.

11. The liquid crystal display device according to claim 9, wherein the insulating layer is processed to be inclined in advance so as to increase in thickness in the extending direction of the slits from the vicinity of the ends of the slits toward the ends of the slits and so as to increase in thickness from the vicinity of the inflected portions of the slits toward the inflected portions of the slits.

12. The liquid crystal display device according to claim 9, wherein the vicinity of the ends of the slits in the extending direction of the slits and the vicinity of the inflected portions of the slits are domain generating regions.

13. The liquid crystal display device according to claim 1,
wherein the one of the pixel electrode and the common electrode including the slits formed therein comprises a comb electrode, and
wherein one of the ends of the slits in the extending direction of the slits is open while another end of the slits is closed.

14. The liquid crystal display device according to claim 1, wherein the ends of the slits in the extending direction of the slits are closed.

15. The liquid crystal display device according to claim 5, wherein the slits having the inflected portions are bent at the inflected portions of the slits so that the extending direction of the slits changes from the bent inflection portion thereof.

16. The liquid crystal display device according to claim 9, wherein the slits having the inflected portions are bent at the inflection portions of the slits so that the extending direction of the slits changes from the bent inflection portion thereof.

* * * * *